UNITED STATES PATENT OFFICE.

JAMES M. COPPERNOLL AND JOHN W. BRANDOW, OF JORDANVILLE, N. Y.

WOOD-FILLER.

SPECIFICATION forming part of Letters Patent No. 319,792, dated June 9, 1885.

Application filed October 8, 1884. (Specimens.)

*To all whom it may concern:*

Be it known that we, JAMES M. COPPERNOLL and JOHN W. BRANDOW, citizens of the United States, residing at Jordanville, in the county of Herkimer and State of New York, have invented a new and useful Compound for Filling Wood, of which the following is a specification, reference being had to the accompanying drawings.

Our invention has relation to a composition of matter designed as a filler for filling the pores of prepared wood prior to varnishing, or painting and varnishing the wood; and the invention consists in the following-named ingredients, compounded in the manner and proportions hereinafter set forth.

The composition consists of the following ingredients, viz: linseed-oil, (boiled,) one-fourth gallon; corn-starch, five pounds; gum-shellac, five ounces; red lead, four ounces; pulverized raw umber, two ounces; plaster or gypsum, eight ounces; gypsum, (white,) two ounces. The plaster or gypsum here referred to is a mineral in stone form quarried near Syracuse, Onondaga county, New York, and is ground or pulverized and used by farmers of this section as a fertilizer. It is sown by hand, and considered very beneficial in dry weather. The object of using this dark-colored plaster is that it makes the surface harder, and it helps to fill the pores of the wood and is one of the principal ingredients that effect the desired end. The white gypsum is only used in case where it is desired to use a light-colored filler for light wood, and is obtained in Europe.

We compound the ingredients above named in the proportions stated, in the following manner, to wit: Dissolve the gum-shellac, red lead, and pulverized raw umber in the boiled linseed-oil by boiling them in said oil. When cooled, add the plaster or gypsum and other ingredients, and boil the whole until the corn-starch is thoroughly cooked. After it has cooled it should be thinned to the proper consistence to be applied to the surface of the wood with a brush by the use of benzine or petroleum or spirits of turpentine. Either may be used for this purpose. When thus prepared, the composition is used as a substitute for lead in filling the pores or grain of the wood in carriage-painting, and in finishing wood in natural colors in house-painting, or the interior wood-work of railway-cars. Before applying the filler the surface should be prepared and sand-papered and the filler applied afterward with a bristle brush, and is let stand until the oil penetrates the wood thoroughly, or until it sets and becomes sticky. The surface should then be rubbed with a piece of cloth or some excelsior until the job is clean. After the job has stood twenty-four hours it should be puttied, if there are imperfections or holes in the surface, and then dusted, and another coat of the filler is applied with the brush, as before, and rubbed off clean with a rag, and left from twelve to twenty-four hours to dry, and the surface is then ready for the color, and is painted in the ordinary manner.

For furniture and house work, one coat of the filler will make a neat appearance when applied with a brush and rubbed as before stated.

Having thus fully described our invention, what we claim as new, and desire to secure by Letters Patent of the United States, is—

1. The herein-described composition of matter, consisting of boiled linseed-oil, corn-starch, gum-shellac, red lead, pulverized raw umber, plaster or gypsum, and a vehicle for mixing them, in the proportions and the manner specified.

2. The herein-described composition of matter for use as a wood-filler, consisting of linseed-oil, corn-starch, gum-shellac, red lead, umber, plaster or gypsum, gypsum white, and a vehicle for mixing the aforesaid ingredients, substantially in the proportions stated.

In testimony that we claim the foregoing as our own we have hereto affixed our signatures in presence of two witnesses.

JAMES M. COPPERNOLL.
JOHN W. BRANDOW.

Witnesses:
WALTER E. CHASE,
FREEMAN H. BELL.